(12) United States Patent
Pinet et al.

(10) Patent No.: US 8,309,784 B2
(45) Date of Patent: Nov. 13, 2012

(54) METHOD FOR CONFINING A SUBSTANCE BY VITRIFICATION

(75) Inventors: Olivier Pinet, Poulx (FR); Thierry Blisson, Pont Saint-Esprit (FR); Agnès Grandjean, Saint-Marcel-de-Careiret (FR); Sophie Schuller, Chusclan (FR)

(73) Assignee: Commissariat a l'Energie Atomique, Paris (FR)

( * ) Notice: Subject to any disclaimer, the term of this patent is extended or adjusted under 35 U.S.C. 154(b) by 566 days.

(21) Appl. No.: 11/995,656

(22) PCT Filed: Jul. 11, 2006

(86) PCT No.: PCT/EP2006/064101
§ 371 (c)(1),
(2), (4) Date: Jan. 14, 2008

(87) PCT Pub. No.: WO2007/009914
PCT Pub. Date: Jan. 25, 2007

(65) Prior Publication Data
US 2008/0281141 A1    Nov. 13, 2008

(30) Foreign Application Priority Data
Jul. 15, 2005 (FR) ...................................... 05 52218

(51) Int. Cl.
G21F 9/00 (2006.01)
G21F 9/16 (2006.01)
G21F 9/20 (2006.01)
C03C 8/24 (2006.01)
C03C 17/04 (2006.01)
C03C 27/02 (2006.01)
C03C 8/02 (2006.01)

(52) U.S. Cl. ................. 588/11; 588/1; 588/20; 65/33.6; 65/59.5; 501/21

(58) Field of Classification Search ................. 588/1–20, 588/301–400; 65/33.6, 59.5; 501/15, 17, 501/21
See application file for complete search history.

(56) References Cited

U.S. PATENT DOCUMENTS

| | | | |
|---|---|---|---|
| 4,097,401 A * | 6/1978 | Guber et al. | ..................... 588/12 |
| 5,662,579 A | 9/1997 | Bickford | |
| 5,947,887 A | 9/1999 | White et al. | |
| 6,080,224 A * | 6/2000 | Turmel et al. | ..................... 75/401 |
| 2004/0024277 A1 | 2/2004 | Mulcey et al. | |
| 2008/0281141 A1 * | 11/2008 | Pinet et al. | ..................... 588/11 |

FOREIGN PATENT DOCUMENTS

DE        19612700        5/1997

OTHER PUBLICATIONS

Jantzen et al. "Chemical oxygen demand (COD) for monitoring reduction-oxidation (redox) equilibrium during high level waste (HLW) vitrification (U)" Westinghouse Savannah River Company, Apr. 30, 2004.*
English language translation of the International Preliminary Report on Patentability from corresponding International Application No. PCT/EP2006/064101, dated May 29, 2008.
Schreiber et al., "Redox Systematics in Model Glass Compositions from West Valley," Mat. Res. Soc. Symp. Proc., vol. 294 (1993) Materials Research Society, pp. 87-94.
Pinet et al., "Redox Effect on Waste Containment Glass Properties: Case of a Borosilicate Glass Containing 16 wt% $MoO_3$," Glass Technology, vol. 43C, (2002), Proc. XIX Int. Congr. Glass, Edinburgh, Jul. 1-6, 2001, pp. 1-4.
Pinet et al., "Characteristic Oxygen Fugacity of Redox Couples in Glass Applied to the Analysis of the Redox State of Glass Melts," American Ceramic Society, Indianapolis, Indiana, (Apr. 2000).
Darab, J.G., et al., "X-Ray absorption spectroscopic investigation of the environment of cerium in glasses based on complex cerium alkali borosilicate compositions", Journal of Non-Cyrstalline Solids, 1998, p. 162-174, vol. 226.
Lopez, Christophe, "Solubilite des actinides et de leurs simulants dans les verres nucleaires limites d'incorporation et comprehension des mechanismes", Rapport Commissariat a I Energie Atomique-R-6019, 2003, Chapter 3, p. 120-138.
Schreiber Henry D., et al., "Redox chemistry in candidate glasses for nuclear waster immobilization", J. Am. Ceram. Soc., 1987, p. 591-594, vol. 70, No. 8.

* cited by examiner

Primary Examiner — Stanley Silverman
Assistant Examiner — Jennifer Smith
(74) Attorney, Agent, or Firm — Brinks Hofer Gilson & Lione

(57) ABSTRACT

The present invention relates to a process for the manufacture of a glass frit for the containment by vitrification of a material comprising at least one oxidizable or reducible chemical species, and also to a process for the containment of said material by vitrification. The process for the manufacture of the glass frit comprises a step of incorporating into a raw glass frit at least one redox couple, the nature and the amount of which make it possible to maintain said at least one chemical species in its oxidized or reduced state. The containment process comprises mixing and hot melting the resulting glass frit and the material to be contained. The present invention makes it possible to optimize the containment of pollutants such as radionucleides, metals and metalloids. The material may be nuclear waste or a material derived from the incineration of household refuse.

29 Claims, No Drawings

METHOD FOR CONFINING A SUBSTANCE BY VITRIFICATION

This application is a National Stage application of International Application No. PCT/EP2006/064101 filed Jul. 11, 2006, the entire content of which is hereby incorporated herein by reference. This application also claims the benefit under U.S.C. §119 of French Patent Application No. 0552218, filed Jul. 15, 2005.

TECHNICAL FIELD

The present invention relates to a process for the containment of a substance by vitrification.

The substances targeted are mainly mineral waste or waste in solution. The present invention allows, for example, the containment of nuclear waste in a glass matrix.

It also allows the containment of any industrial waste which comprises mineral species, in particular polluting metals and/or polluting metal ions. Mention may, for example, be made of nuclear waste, solid residues originating from the incineration of household refuse, in particular residues consisting of boiler bottom ash, "fly" ash, and filter cakes originating from the neutralization and processing of incineration smoke.

The present invention provides an improvement over the prior art processes for the containment of waste by vitrification.

PRIOR ART

In the tricky example of the containment by vitrificaton of nuclear waste or of household refuse incineration residues, the glasses currently produced industrially are the result of formulation studies which optimize their composition, or even their production temperature insofar as the latter is not already fixed by constraints related to the process or to the composition of the glasses.

These composition and temperature optimizations are aimed at obtaining a glass formulation which at the same time:

makes it possible to reduce the volume of the waste once contained, allows compatibility with a production in industrial processes, in particular those currently available, makes it possible to improve the containment qualities of the final glass matrix (chemical durability, irradiation resistance, resistance to leaching, etc.) with a view to its storage.

In the current vitrification processes, the role of the glass frit is solely to provide the vitrification adjuvants which make it possible to achieve, after mixing with the waste, containment thereof.

None of the glass frits described in the prior art has any action on the redox equilibrium of the final glass since either it does not contain any multivalent species, i.e. species that can exist with various degrees of oxidation in the glass, or the oxidation state in which they are incorporated into the frit is not the subject of any optimization. In addition, the redox equilibria of the various multivalent species that may be present in the glass frit have never been the subject of any attention.

The current processes for the vitrification of nuclear waste generally comprise two steps: evaporation-calcination of fission-product solutions so as to obtain a calcine, followed by vitrification of the resulting calcine. The evaporation-calcination step can be carried out, for example, in a rotating tube heated by a resistance furnace. This process is known to those skilled in the art.

A glass former or glass frit is then added to the calcine in order to produce the containment glass. For example, in the La Hague facilities, the latter is a borosilicate glass, consisting mainly of approximately 80% $SiO_2$ (silica), $B_2O_3$ (boric anhydride), $Al_2O_3$ (alumina) and $Na_2O$ (sodium oxide).

Conventional glass producers (manufacturer of dishes) optimize the redox state of their glass, in order to optimize the color, so as to prevent inclusions of gas and to optimize the thermal properties of their glass baths. However, in the glasses of conventional glass producers, the concentrations of the multivalent species are very low compared with those of nuclear waste containment glasses according to the present invention, and the methods developed for regulating the redox of their glass are based on additions of reducing agents such as cokes, sulfides, etc., or of oxidizing agents such as sulfates, nitrates, etc., to their glass batch materials.

For the present inventors, numerous drawbacks would have to be overcome in relation to the containment techniques of the prior art:

an additional stream of material to be managed at the input of the process, additional streams of gas to be managed even though the gas processing system is sophisticated due to the radioactive medium, the fact of adding a stream of material to the process, in addition to those of the waste and of the frit, means that the company has to guarantee additional parameters in order to achieve the defined glass: to achieve the desired redox state, the waste stream and the stream of reducing agents or of oxidizing agents must be tightly correlated, and this correlation is difficult and requires, for example, taking into account the possible variations in the redox level of the waste stream, the reducing agents and the oxidizing agents to be used with this process are necessarily powerful since, in addition to the multivalent species that must be oxidized or reduced according to the oxidation state in which it is desired to contain them, this reaction is disturbed by the oxidizing agents or reducing agents of the surrounding medium, for example sparging gas, nitrates, carbonaceous material, etc., with which they will react first, which is not favorable, a priori, to a precise control of the redox state of the glass, the bringing into contact of powerfully oxidizing and/or powerfully reducing material can result in exothermic reactions that it is desired to limit in the case of a waste vitrification process so as to guarantee a maximum safety level and to avoid maintenance procedures on the process.

Generally, the degree of incorporation of oxides of fission products (calcines) or waste to be vitrified ranges from 12 to 18% by mass on such glasses. For all the known nuclear glasses, it generally evolves, according to the composition of the waste and the type of glass, between 6% and 20% by mass. For metal such as cerium in the oxidation state +IV, it is a maximum of 2% by mass. The degree of incorporation is therefore limited.

It is therefore necessary to further improve the containment by vitrification of toxic waste such as that mentioned above, in particular nuclear waste, and to develop processes for the containment of said waste which are easy to implement at the industrial level, more economical and less dangerous, while at the same time using currently available or simplified plants.

The containment glasses must be even more solid, more dense, more stable over time, more resistant to leaching and to irradiation, and must make it possible to store more waste while at the same time further reducing the storage volume.

DISCLOSURE OF THE INVENTION

The present invention makes it possible to achieve the abovementioned objectives by simply and soundly regulating the redox state of a glass bath at a desired level, by virtue of replacing the conventional glass frits with a glass frit having a "redox power" without adding any further constraints to the method of industrial control used for the containment of a material by vitrification, and without generating any additional inlet and outlet streams of materials compared with the vitrification processes of the prior art.

For this, the present invention relates to a process for the manufacture of a redox glass frit for the containment by vitrification of a material comprising at least one oxidizable or reducible chemical species, said process comprising the steps consisting in:
($a^1$) selecting at least one redox couple which makes it possible to maintain said at least one chemical species in a given redox equilibrium,
($a^2$) determining the amount of said chemical species present for a given amount of said material,
($a^3$) determining by stoichiometry, for said given amount of said material, the minimum amount of said at least one redox couple necessary to maintain said at least one chemical species at said given redox equilibrium,
($a^4$) optionally, adjusting said minimum amount of said at least one redox couple so as to take into account other oxidizing or reducing elements of the material and/or of the raw glass frit and/or of the environment in which the containment by vitrification of the material will be carried out,
($a^5$) incorporating, by mixing, at least said minimum, optionally adjusted, amount of said at least one redox couple into an amount of raw glass frit, or of its precursors, suitable for the containment of said given amount of material, and bringing the mixture to a temperature sufficient to obtain a glass melt, and
($a^6$) cooling the glass melt obtained and working it so as to obtain a redox glass frit for the containment of said material by vitrification.

The present invention also relates to a redox glass frit that can be obtained by means of this process. The details regarding this frit are given hereinafter, through the explanation of the present invention.

The present invention also relates to a process for the containment by vitrification of a material comprising at least one oxidizable or reducible chemical species, said process comprising the steps consisting in:
(a) mixing and hot-melting a redox glass frit obtained according to the process of the invention and the material to be contained in proportions suitable for the containment of said material by vitrification, and
(b) vitrifying the mixture so as to contain said material.

The redox glass frit of the present invention, used in the containment process of the invention, is that obtained in step ($a^6$) of the process of the invention.

According to a variant of the present invention, the waste to be contained can be mixed directly with the glass melt obtained in step ($a^5$) of the process of the invention, and then the mixture following step (b) of the containment process of the invention can be vitrified. In this variant, step ($a^6$) for preparing the glass frit is not applied.

A principle feature of the present invention is the regulation of the redox state of the containment glass frit by introducing into the latter one or more redox species, also called multivalent species. When the containment of the waste is complete, this or these multivalent species is (are) part of the final composition of the glass, if it (they) is (are) not eliminated during the containment (one or more volatile species). The redox power of the redox frit of the present invention is fixed by the amount and the redox state of the one or more multivalent species incorporated.

The inventors have in fact noted that optimization of the redox state of the glass frit used for the containment of the waste in accordance with the present invention results, according to the waste to be vitrified and to the redox state of the frit of the present invention, in the quality of the containment glass formulated being improved, in its production being facilitated, and even, in certain cases, in the degree of incorporation of waste into the glass being increased, compared with the containment glasses of the prior art.

Several advantages associated with the use of the process of the invention may be mentioned:
  it does not generate any additional stream of material compared with a process which does not optimize the redox of the glass, whether at the input of the process, since the reducing agents are dissolved in the frit, or at the output, since this process for regulating the redox does not generate any additional gases;
  it is a sound process for redox regulation, since the redox reactions essentially take place between the multivalent species incorporated into the glass frit and the multivalent species after their incorporation into the glass melt. As a result, the fluctuations in the redox power of the surrounding medium (nitrate content of the waste, sparging, carbon content, etc.) are expected to have only a slight effect on the final redox state of the glass;
  all the difficulties associated with regulating the redox are controlled upstream of the active industrial process during the production of the frit in inactive mode;
  the amount of required oxidizing agents or reducing agents to be added to the frit according to the invention is much lower than with the other commonly used techniques for regulating redox;
  the oxidizing agents that may be used are, in addition, less powerful than those of the prior art and less accessible since they are dissolved in a glass frit, which limits the risk of exothermic reaction between oxidizing agents and reducing agents, which guarantees a good level of safety for the process.

The inventors have noted that it is possible to introduce many multivalent elements, for example such as cerium, iron, chromium, plutonium, molybdenum, sulfur, cesium, etc., into the containment glass frits of the prior art (see below). They have also noted that the degree of oxidation with which they are incorporated into the glass makes it possible, unexpectedly, to modify the properties of the final glass, such as:
  the degrees of incorporation of certain elements into the glass differ notably according to their degree of oxidation, which has a direct impact on the glass volume reducing factor obtained after the containment of the material by vitrification (see document [1]);
  the properties of the molten glass can be modified by the redox state of certain species and, in certain cases, allow the elimination of foaming as described in document [2]; and
  the chemical durability qualities of the glasses can, in certain cases, depend on the redox state of the glass (document [3]).

In the present text, the expression "oxidizable or reducible chemical species" is intended to mean one or more chemical species which, according to its (their) oxidation state, may be oxidized or reduced by oxidation-reduction reactions. The objective achieved by the containment process of the invention is the containment of this at least one chemical species in the glass formed in step (c) of the process.

According to the invention, the oxidizable or reducible chemical species may, for example, be a pollutant which must be contained by vitrification. It may, for example, be a radionucleide, a metal or nonmetal element or cation, a metalloid, sulfur or a mixture thereof. It may, for example, also be one or more lanthanides and actinides. The oxidizable or reducible chemical species may also be an element of the waste which must be evaporated off the glass with the aim of improving the production of vitrified material and/or the properties of waste containment by vitrification.

According to the invention, when said chemical species is a metal cation or element, it may be chosen, for example, from As, Cd, Ce, Cr, Cs, Fe, Hg, Li, Mg, Mn, Mo, Na, Ni, Pb, Sb, Tc, Ti, V, Zn, actinides (Pu, for example) or sulfur, a salt thereof, or a mixture of two or more of these elements, cations and/or their salts.

The expression "containment of a material by vitrification" is intended to mean a process by which said material is contained in a glass matrix, i.e. intimately mixed and retained in this matrix.

The term "material" is intended to mean any type of material that may be contained in a glass matrix by vitrification with the abovementioned characteristics (stability over time, etc.). It may, for example, be waste derived from the incineration of household refuse, or nuclear waste.

According to the invention, in an extreme case, the material may consist exclusively of one or more oxidizable or reducible chemical species for the purpose of the present invention. The term "material" and the expression "oxidizable or reducible chemical species" can therefore be used without distinction in the present text.

The "given amount of material" defines a simple basis for calculation in order to determine the minimum amount of redox couple useful for the implementation of the present invention for an amount of raw glass frit sufficient for the containment of said given amount of material. It may be chosen arbitrarily, and may, for example, correspond to an amount that can be readily handled in a laboratory and that is sufficient to be able to determine the content of said at least one oxidizable or reducible chemical species. The essential thing is that this amount is known, i.e. its weight is measured, in order to be able to implement the present invention. The amount of containment glass frit to be used in order to contain said material may subsequently be determined by simple extrapolation, for example by means of a graph or of software expressing the amount of glass frit necessary for the containment of the material as a function of the weight of said material.

In the present description, the term "raw glass frit" or its precursors contrast with "redox glass frit" in that the "raw glass frit" or its precursors does not comprise any redox couple added in accordance with the present invention.

In the present text, the term "raw glass frit" is intended to mean starting materials used for the manufacture of the "redox glass frit" of the present invention. It may be glass, but also glass precursors such as carbonates, nitrates, oxides, borides, nitrides, carbides, metals, sulfates, sulfides, hydroxides, etc., or mixtures thereof.

When glass is used, it may be in various forms: it may, for example, be a powder, flakes, beads, or even pieces of glass.

According to the invention, the raw glass frit or its precursors may, for example, advantageously be in a physicochemical form such as those commonly used for providing the containment glass in one of the known processes for the containment of waste by vitrification of the prior art.

Its composition depends of course on the desired objective in implementing the vitrification process of the invention, in particular on the material to be contained.

The raw glass frit used may consist, for example, of a silica-based glass and may comprise mineral compounds, such as $SiO_2$ (silica), $B_2O_3$ (boric anhydride), $Al_2O_3$ (alumina), $Na_2O$ (sodium oxide), $Fe_2O_3$, $CaO$, $Li_2O$, $ZnO$, $ZrO_2$, etc.

For example, when the glass frit is intended for the containment of a material such as waste comprising radionucleides and/or metalloids and/or metals, the raw glass frit is preferably a silicate glass frit. It may, for example, be a glass frit comprising mainly approximately 80% of $SiO_2$ (silica), $B_2O_3$ (boric anhydride), $Al_2O_3$ (alumina) and $Na_2O$ (sodium oxide). It may, for example, be a glass frit comprising from 20% to 80% or from 20% to 75% by weight of $SiO_2$; from 0 to 40% or from 0 to 25% by weight of $B_2O_3$; from 0 to 20% of $Fe_2O_3$; from 0 to 25% by weight of $Na_2O$; from 0 to 25% or from 0 to 20% by weight of $Al_2O_3$; from 0 to 20% or from 0 to 15% by weight of CaO; from 0 to 20% or from 0 to 10% by weight of $Li_2O$; from 0 to 20% by weight of ZnO; and from 0 to 20% or from 0 to 15% by weight of $ZrO_2$.

Other frits known to those skilled in the art and suitable for the containment of such materials may of course be used in the context of the present invention.

The expression "redox glass frit" or "glass frit having a redox power" or "glass frit of the present invention" is intended to mean a raw glass frit into which one or more redox couple(s) has (have) been incorporated, for example in accordance with the process for manufacturing the frit of the invention. According to the redox couple(s) chosen, as disclosed hereinafter, this glass frit may have a reducing or oxidizing power as a function of the chemical species or material which must be contained by vitrification according to the process of the invention.

The term "redox couple" is intended to mean an oxidizing/reducing couple for a chemical element. It may be one or more multivalent species, i.e. species which have one or more oxidized and reduced forms. It may in general be one or more of the chemical elements, that may be in an oxidized or reduced form, of the Periodic Table of Elements.

The redox couple may be introduced into the raw glass frit or its precursors by simple mixing.

For example, when it is a question of containing a nuclear waste according to the process of the present invention, the redox couple may, for example, be that of an element chosen from the group comprising Fe, Cr, V, S, Sb, Ti, As, Ce, Zn or a mixture of these couples.

In fact, in the industrial processes most common in the nuclear waste containment field, the waste is a mixture of oxides and of nitrates. The redox state of the final glass is therefore controlled by the redox level of the waste: it is then oxidized. The process of the invention makes it possible to contain this waste in a glass whose redox state is optimized with the numerous advantages described in the present description.

There are numerous multivalent species that may be used to give the glass frit a redox power. Among, these mention may, by way of nonlimiting example, be made of the following species, which may be used alone or as a mixture: $Fe(II)/Fe(III)$; $Ce(IV)/Ce(III)$; $Ti(IV)/Ti(III)$; $V(V)/V(III)$; $Cr(VI)/Cr(III)/Cr(II)$; $S(+VI)/S(-II)$; $Sb(V)/Sb(III)$; $Zn(II)/Zn(0)$;

As(V)/As(III); etc. Document [4] groups together these non-limiting examples of redox couples and of yet others that can be used in the present invention, and also their characteristic redox potential.

The oxidizing or reducing agents that can be used for the regulation of the redox equilibrium of the redox frit according to the invention may also be provided by the elements constituting the glass (precursors), appropriately choosing their chemical form, for instance nitrates, sulfates or oxides for the oxidizing agents, and carbides, nitrides, borides or silicides for the reducing agents; or in the form of oxidizing or reducing agents that are not part of the composition of the final glass since they disappear completely at the melting point of the frit, during the production of the frit "having a redox power" or containment frit. The latter agents are, for example, organic materials, coke, graphite, nitric acid, etc.

Some of the chemical elements of the Periodic Table of Chemical Elements possess several redox couples and corresponding redox potentials (several degrees of oxidation), that can be used in the present invention. Not all have been mentioned above, but only for practical reasons. Those skilled in the art will be able to readily find the most appropriate couple(s) among the elements of the Periodic Table and the redox potential tables available to everyone, in order to implement the present invention.

The nature of the multivalent elements, or redox couple(s), incorporated into the raw glass frit, the content thereof and the redox state thereof in the frit are to be determined according to the composition of the material to be contained, for example of the waste. It is when the multivalent species are incorporated into the glass that they equilibrate their redox state with the oxygen potential or oxygen activity imposed by the redox state of the multivalent elements incorporated into the glass frit.

Those skilled in the art, aware that any redox couple oxidizes a redox couple of lower potential, will be able to readily choose the redox couple(s) to be used according to the one or more oxidizable or reducible chemical species of the material for implementing the present invention, the objective being to maintain in the vitrified glass one or other of the oxidized or reduced form of the one or more oxidizable or reducible chemical species. When several couples are available, the choice may also be made according to the cost of the redox couple or of its influence on other properties of the glass (viscosity, chemical durability, microstructure, etc.).

The amount of "redox couple" to be incorporated into the glass frit is determined in a first approach by stoichiometry based on the oxidation-reduction equations for the one or more chemical species of the material to be contained with the redox couple(s) chosen. Those skilled in the art will therefore have no difficulty in determining this amount.

The term "given redox equilibrium" is intended to mean the equilibrium, i.e. the ratio, intended between the oxidized state and the reduced state of said chemical species. This equilibrium makes it possible in particular to increase the solubility of this chemical species in the containment glass, and therefore to improve its containment. This equilibrium is reached by virtue of the amount of redox couple, optionally adjusted, added to the glass frit in order to obtain the redox glass frit according to the invention. For example, for cerium, according to the invention, beyond a CeIII/CeIV ratio of 6.67, a total cerium content of 7% by mass may be obtained with a melting point of 1200° C.

It may be useful to adjust the amount of "redox couple" so as to take into account influences related to the elements which do not go to make up the composition of the glass but which could have an effect on the redox power of the glass, for example the gaseous environment during the preparation of the frit and/or of the containment, the presence of carbonaceous materials and/or of nitrates, etc. This is step "$a^4$" of the process of the invention. This step is within the scope of those skilled in the art, who will add or reduce the amount of redox couple appropriately for the implementation of the process of the invention.

According to the invention, it is also possible to incorporate, into the glass frit or its precursors, at least one compound for regulating the redox ratio of the redox couple in the glass frit manufactured, according to said at least one chemical species. The term "redox ratio" is intended to mean the proportion of the oxidized form relative to the reduced form of the element constituting the redox couple.

This redox ratio can be determined stoichiometrically from the chemical equations for oxidation-reduction of the species brought together. This compound may be a compound whose presence has an effect on the oxidized form$\leftrightarrows$reduced form equilibrium of the redox couple by promoting one or other of these forms. For example, when the redox couple is $Fe^{2+}/Fe^{3+}$, the compound for regulating the redox ratio of this couple may, for example, be graphite, which promotes the $Fe^{2+}$ form of the abovementioned couple. More generally, this compound may be chosen from graphite, organic materials, coke, carbides, borides, silicides, sulfides, metals, etc.

According to the invention, the incorporation of the redox couple into the raw glass frit, and optionally of the chemical compound for regulating the redox ratio of the redox couple(s), may be carried out by simply mixing and hot "melting" them with the raw glass frit or raw frit or its precursors as described above, for example in the form of oxides, carbonates or nitrates.

The temperature of the melt bath should be quite high so as to bring about complete melting of the glass frit in the furnace, and if necessary, of the material, but not too high to optimize the heat balance for the melting while preventing a needless loss of energy. For example, when the raw glass frit is a borosilicate glass frit, the heating can be carried out at a temperature of from 1100 to 1400° C., for example at 1200° C., so as to melt the glass.

The heating may be carried out in any type of furnace which makes it possible to melt the raw glass frit used. Advantageously, it is a vitrification furnace. The heating may be carried out, for example, in a metal pot, for example by means of a 200-kW power generator operating at a frequency of 4 kHz. The glass inside the pot is then melted by conduction upon contact with the metal wall.

Other appropriate heating means known to those skilled in the art in the technical field of the present invention may, of course, be used, for example direct or indirect plasma-torch heating, electric-arc heating, gas heating, a muffle furnace, by direct induction in the glass, etc. The essential thing is that a melt bath is formed from the raw glass frit or its precursors so as to be able to incorporate therein the redox couple(s).

The production of the redox frit consists in mixing the raw-frit precursor elements and the redox couple(s) with the oxidizing agents and the reducing agents suitable for ultimately producing the correct composition and the correct redox equilibrium of the redox couple, this mixing being carried out at a temperature sufficiently high to produce a glass melt.

According to the invention, as a variant, the redox glass frit obtained can be used immediately in its melt bath form obtained in step ($a^5$) to contain a material according to the process of the invention.

Preferably, the glass melt obtained is cooled and worked so as to obtain a raw glass frit for the purpose of the present invention, i.e. that can be used to contain said material by vitrification. For example, it may be made into a particulate form by grinding for storage until the containment process of the present invention is carried out. The techniques for forming glass powders or beads, or other forms such as those mentioned in the present description, are known to those skilled in the art.

When it is made into particulate form, it is cooled, and then introduced into the vitrification furnace at the same time as the waste. The inventors have noted that, when the vitrification adjuvant glass, or glass frit having a "redox power" of the present invention is introduced into the vitrification process of the present invention in particulate form, its effectiveness in regulating the redox can unexpectedly be modified according to the sizes of these particles. Too great a surface between the glass frit "having a redox power" and the oxidizing or reducing atmosphere could disturb the redox state of the frit before the incorporation of all or part of the elements to be contained. According to the invention, particles ranging from 1 µm to 2 cm in size, preferably from 100 µm to 1 cm, will be preferred.

According to the invention, it may be advantageous to introduce the frit of the present invention in a particulate form, for example in the form of glass beads. In fact, this enables the redox frit of the present invention to be incorporated rapidly into the glass melt bath at the time the containment process of the invention is carried out, and prevents as much as possible any disturbances of the atmosphere above the glass bath.

The process of the invention is therefore a process for producing glass in which all or some of the vitrification adjuvants are introduced in the form of a glass which contains one or more multivalent chemical species for imposing the redox state of the final glass. This redox level is regulated upstream of the industrial vitrification process for the containment of a material.

In the containment process of the present invention, the mixing of the glass frit having a redox power and material is preferably carried out so as to obtain a homogeneous mixture and to prevent the formation of "pockets" of material, for example pockets of calcines in the case of nuclear waste. It may be carried out in the redox glass frit before melting or in the redox glass frit undergoing melting. The homogenization may be carried out, for example, by means of bubbling, of a mechanical stirrer, of convection associated with thermal gradients, etc.

According to the invention, the redox glass frit may be introduced sequentially to the introduction of all or part of said material to be vitrified, as carried out in the current industrial vitrification processes.

According to the invention, the material to be vitrified and the redox glass frit can be introduced at two different points of a vitrification furnace with a view to mixing them for the containment of said material. The mixing is thus carried out in the furnace, without any other prior step.

According to the invention, the material to be contained/redox glass frit proportions are chosen so as to enable the containment of said material in the glass formed by the redox glass frit. These proportions are referred to as "appropriate" in the present description. Those skilled in the art will have no trouble in determining said proportions. For example, in the case of nuclear waste, these proportions are determined so as to obtain a containment corresponding to the requirements for the subsequent storage of this waste. In this example, the proportions are from 5% to 50% by weight of nuclear waste per 50% to 95% by weight of redox glass frit.

The present invention advantageously makes it possible, in certain cases, to incorporate more material than with the glass frits of the prior art. These cases are those where one of the various oxidized or reduced form(s) of a chemical species of the material shows a solubility in the glass that is different than that of the other forms. For example, cerium is more soluble in silicate glasses in the $Ce^{+III}$ state than in the $Ce^{+IV}$ state. In order to be able to incorporate more cerium-rich waste, the inventors of the present application have therefore invented a glass frit having a reducing power of the present invention. In the example of cerium, the glass frit of the invention is a reducing frit which makes it possible to promote the $Ce^{+III}$ form of cerium. This frit makes it possible to contain more than 7% by mass of cerium, whereas, at the same temperature, it was difficult to achieve 2% with the prior art frits.

According to the invention, the heating of the mixture of redox glass frit and material can be carried out in any type of furnace for melting the glass frit used as a mixture with the material to be contained. Advantageously, it is a vitrification furnace, preferably suitable for the material to be contained, in particular when it is a waste, for example nuclear waste and/or waste comprising heavy metals and/or toxic volatile elements.

The heating is also carried out to melting, i.e. it must make it possible to form a melt bath as indicated above for the manufacture of the glass frit. The temperature of the melt bath should be high enough to bring about complete melting of the redox glass frit in the furnace and to produce incorporation of the elements to be contained as a mixture with the material. This temperature therefore depends on the glass frit and on the material to be contained.

According to the invention, when the redox glass frit is a borosilicate glass frit, the heating of the mixture of glass frit and material can be carried out, for example, to a temperature of 1000 to 1600° C., for example to 1200° C.

According to the invention, the heating of the mixture is preferably performed in a vitrification furnace, for example in a metal pot, heated, for example, to a temperature of 1000 to 1600° C., for example to 1200° C., so as to melt the glass. The heating can be carried out, for example, by means of a 200-kW power generator operating at a frequency of 4 kHz. The glass inside the metal pot is then melted by conduction upon contact with the metal wall.

Other heating means known to those skilled in the art in the technical field of the present invention may of course be used, for example those indicated above.

The present invention has many advantages. For example, the process of the invention does not generate any additional stream of material compared with the prior art processes which do not optimize the redox power of the glass, whether at the input of the process since the reducing agents are dissolved in the frit, or at the output since the process of the present invention does not generate any additional gases.

Furthermore, the process of the invention is compatible with current industrial vitrification processes and plants, since it requires only the use of a redox frit in accordance with the present invention.

The process of the invention is a sound process for regulating redox power, since the redox reactions take place essentially between the multivalent species incorporated for the manufacture of the glass frit having a redox power and the multivalent species of the material or forming the material to be contained after its incorporation into the molten glass. As a result, the fluctuations in the redox power of the surrounding medium, i.e., for example, the nitrate content of the waste, the bubbling, the carbon content, etc., have only a limited effect on the final redox state of the glass.

In addition, all the difficulties that were associated with the regulation of the redox power are, with the process of the invention, managed upstream of the active industrial process, i.e. during the production of the frit of the present invention, in the inactive mode.

Other characteristics and advantages may become apparent to those skilled in the art upon reading the following nonlimiting examples.

EXAMPLES

In these examples, a frit having a "redox power" is produced and tested on a scale of several hundred grams.

Example 1

Manufacture of the Frit

The frit tested has the following chemical composition, expressed as % by mass: $SiO_2$: 53.5%+$B_2O_3$: 16.5%+$Fe_2O_3$: 9.1%+$Na_2O$: 6.4%+$Al_2O_3$: 3.9%+CaO: 4.8%+$Li_2O$: 2.3%+ZnO: 2.9%+$ZrO_2$: 0.6%.

It is a conventional borosilicate glass frit, hereinafter referred to as "type R7/T7", which serves as vitrification adjuvant for the current vitrification of fission-product solutions at La Hague (France), to which iron is added, according to the present invention, so as to give the frit a "redox power". In this example, it is a frit having a reducing power which is desired.

The redox state of the frit is fixed by imposing a given $Fe^{II}/Fe^{III}$ ratio. The $Fe^{II}/Fe^{III}$ ratio is chosen so as to be 9/1. This ratio is obtained by virtue of graphite which serves as reducing agent for the iron. The amount of graphite to be added therefore depends in particular on the redox state that it is desired to give to the frit.

The production of this frit and the regulation of the $Fe^{II}/Fe^{III}$ redox ratio in the frit are carried out at the same time by intimately mixing, at 1200° C. in a muffle furnace in air, 700 g of the "type R7/T7" frit, 70 g of iron in the form of $Fe_2O_3$, and 20 g of powdered graphite.

In this example, the amount of glass frit produced each time is of the order of 770 g.

In the glass frit obtained, 90% by weight of the total iron is in $Fe^{II}$ form. The oxygen pressure in the glass at 1200° C. is $10^{-5}$ Pa.

Example 2

Containment of a Waste

The use of the reducing frit obtained according to Example 1 was tested for various applications for which it is appropriate to ultimately have a reduced glass.

The first application concerns the solubilization of cerium, a species which is often present in the solutions to be vitrified and is a principal agent simulating plutonium in inactive mode.

The inventors noted that cerium is more soluble in the $Ce^{+III}$ state than in the $Ce^{+IV}$ state. They observe that, in order to be able to incorporate more cerium-rich waste, it was advisable to manufacture a reduced glass.

The reduced frit of Example 1 was thus intimately mixed with cerium taken in $CeO_2$ form, i.e. in the $Ce^{+IV}$ state: 100 g of mixtures with various cerium contents of 0.4% to 10.5% by mass with respect to $CeO_2$ were brought to 1200° C. in a muffle furnace under air without the addition of additives or other materials.

Glasses incorporating cerium at contents exceeding 7% by mass were thus produced and are homogeneous.

The same experiments were carried out, replacing the reducing frit, firstly, with a frit having the same chemical composition but with a more oxidized iron redox state, and, secondly with "type R7/T7" borosilicate frit of the prior art containing no iron. The latter experiment (borosilicate frit without iron) did not make it possible to incorporate the abovementioned cerium content, and the limiting contents were typically 2% by mass in these cases.

These results clearly demonstrate unquestionable advantages of the present invention compared with the prior art processes.

Example 3

Reduction of Foaming Phenomena

Another application of a frit according to the invention having a "redox power" was tested with the aim of preventing the foaming phenomena which can appear in vitrification processes. These phenomena are due to temperature excursions which induce the reduction of certain elements; the oxygen lost during this reduction then departs in the form of bubbles and causes foaming of the glass at its surface.

The reducing frit of Example 1 makes it possible to preventively reduce the multivalent species responsible for the foaming. The oxygen pressure in the glass bath is thus rendered too low for an increase in temperature to generate reduction reactions and departure of oxygen in the form of bubbles.

The experiment which demonstrates this was carried out on approximately 500 g of molten glass produced by mixing at 1200° C., in a stirred platinum crucible heated by the Joule effect in air, 388 g of the same reduced frit as presented above with 130 g of calcinated, simulated type R7/17 fission-product calcine.

The molten glass thus produced is brought to 1350° C. without causing foaming phenomena to appear.

In order to compare with the prior art, a molten glass is produced according to the same principles, replacing the reduced frit of the present invention with the "type R7/T7" frit of the prior art. The temperature excursion causes a foaming phenomenon to clearly appear between 1200° C. and 1300° C.

These experiments carried out on the laboratory scale are acknowledged to be representative of the phenomena that occur in industrial-scale processes.

These experiments show here again that, by virtue of a frit having the "redox power" in accordance with the present invention, efficient regulation of the redox of the final glass can be obtained without having to carry out further additions, such as reducing additives, for example graphites, organic compounds, nitrates, carbides, metal species, etc., in the vitrification process.

LITERATURE REFERENCES

[1] C. Lopez—Solubilité des actinides et de leurs simulants dans les verres nucléaires limites d'incorporation et compréhension des mécanismes [Solubility of actinides and of simulants thereof in nuclear glasses with incorporation limits and understanding of mechanisms]—Report CEA-R-6019

[2] H. D. Schreiber, S. J. Kozak, P. G. Leonard, K. K. McManus—Redox systematics in model glass compositions from west valley—Mat. Res. Symp. Proc. Vol. 294.- 1993.
[3] C. Pinet, E. Baudrey, J. L. Dussossoy, C. Fillet, J. F. Hollebecque—Redox effect on waste containment glas properties: case of a borosilicate glass containing 16% wt MoO3—Proc. XIX Int. Congr. Glas Edinburgh, 1-6 Jul. 2001, Glass Technol., 2002.
[4] O. Pinet, C. Di Nardo, Characteristic oxygen fugacity of redox couples in glass applied to the analysis of the redox state of glass melts—Processing and characterization of Electrochemical Materials and Device—Ceramic transaction—Vol. 109, American Ceramic Society, Indianapolis, April 2000.

The invention claimed is:

1. A process for containment of a material, the process comprising:
   (a) preparing a redox glass frit;
   (b) mixing and hot-melting the redox glass frit and a material comprising at least one oxidizable or reducible chemical species; and
   (c) vitrifying the mixture wherein the material comprising at least one oxidizable or reducible chemical species is contained;
   wherein the redox glass frit is prepared by a process comprising:
   ($a^1$) selecting at least one redox couple for maintaining the at least one oxidizable or reducible chemical species in a redox equilibrium;
   ($a^2$) determining the amount of the at least one oxidizable or reducible chemical species present for a given amount of the material;
   ($a^3$) determining by stoichiometry, for a given amount of the material, the minimum amount of the at least one redox couple to maintain the at least one oxidizable or reducible chemical species at the given redox equilibrium;
   ($a^4$) optionally, adjusting the minimum amount of the at least one redox couple to account for other oxidizing or reducing elements of the material and/or of the raw glass frit and/or of a vitrification environment;
   ($a^5$) incorporating by mixing, at least the minimum amount of the at least one redox couple or the adjusted minimum amount of the at least one redox couple into an amount of raw glass frit, or of its precursors, wherein the amount of raw glass frit is suitable for the containment of the given amount of material, and bringing the mixture to a temperature sufficient to obtain a glass melt; and
   ($a^6$) cooling and working the glass melt to form the redox glass frit.

2. A process for manufacturing a redox glass frit for containment of a material, the process comprising:
   ($a^1$) selecting at least one redox couple for maintaining at least one oxidizable or reducible chemical species in a redox equilibrium;
   ($a^2$) determining the amount of the at least one oxidizable or reducible chemical species present for a given amount of a material;
   ($a^3$) determining by stoichiometry, for a given amount of the material, the minimum amount of the at least one redox couple to maintain the at least one oxidizable or reducible chemical species at the given redox equilibrium;
   ($a^4$) optionally, adjusting the minimum amount of the at least one redox couple to account for other oxidizing or reducing elements of the material and/or of the raw glass frit and/or of a vitrification environment;
   ($a^5$) incorporating by mixing, at least the minimum amount of the at least one redox couple or the adjusted minimum amount of the at least one redox couple into an amount of raw glass frit, or of its precursors, wherein the amount of raw glass frit is suitable for the containment of the given amount of material, and bringing the mixture to a temperature sufficient to obtain a glass melt; and
   ($a^6$) cooling and working the glass melt;
   wherein a redox glass frit is obtained.

3. The process of claim 1, wherein the at least one chemical species is a radionuclide, a metal or nonmetal element or cation, a metalloid, sulfur, or a mixture thereof.

4. The process of claim 2, wherein the at least one chemical species is a radionuclide, a metal or nonmetal element or cation, a metalloid, sulfur, or a mixture thereof.

5. The process of claim 1, wherein the at least one chemical species is selected from the group consisting of As, Cd, Ce, Cr, Cs, Fe, Hg, Li, Mg, Mn, Mo, Na, Ni, Pb, Sb, Tc, Ti, V, Zn, actinides, sulfur, and a mixture of two or more of the elements, their cations and/or their salts.

6. The process of claim 2, wherein the at least one chemical species is selected from the group consisting of As, Cd, Ce, Cr, Cs, Fe, Hg, Li, Mg, Mn, Mo, Na, Ni, Pb, Sb, Tc, Ti, V, Zn, actinides, sulfur, and a mixture of two or more of the elements, their cations and/or their salts.

7. The process of claim 1, wherein the at least one chemical species is a lanthanide or an actinide.

8. The process of claim 2, wherein the at least one chemical species is a lanthanide or an actinide.

9. The process of claim 1, wherein the redox couple is a redox couple of an element selected from the group consisting of Fe, Cr, V, S, Sb, Ti, As, Ce and Zn.

10. The process of claim 2, wherein the redox couple is a redox couple of an element selected from the group consisting of Fe, Cr, V, S, Sb, Ti, As, Ce and Zn.

11. The process of claim 1, further comprising incorporating into the glass frit or its precursors at least one compound for regulating the redox ratio of the redox couple.

12. The process of claim 2, further comprising incorporating into the glass frit or its precursors at least one compound for regulating the redox ratio of the redox couple.

13. The process of claim 11, wherein the redox couple is $Fe^{2+}/Fe^{3+}$, and the compound for regulating the redox ratio of this couple is graphite.

14. The process of claim 12, wherein the redox couple is $Fe^{2+}/Fe^{3+}$, and the compound for regulating the redox ratio of this couple is graphite.

15. The process of claim 1, wherein the raw glass frit is a borosilicate glass frit.

16. The process of claim 2, wherein the raw glass frit is a borosilicate glass frit.

17. The process of claim 1, wherein the raw glass frit comprises from 20% to 80% by weight of $SiO_2$; from 0% to 25% by weight of $B_2O_3$; from 0% to 20% of $Fe_2O_3$; from 0% to 25% by weight of $Na_2O$; from 0% to 20% by weight of $Al_2O_3$; from 0% to 15% by weight of CaO; from 0% to 10% by weight of $Li_2O$; from 0% to 20% by weight of ZnO; and from 0% to 15% by weight of $ZrO_2$.

18. The process of claim 2, wherein the raw glass frit comprises from 20% to 80% by weight of $SiO_2$; from 0% to 25% by weight of $B_2O_3$; from 0% to 20% of $Fe_2O_3$; from 0% to 25% by weight of $Na_2O$; from 0% to 20% by weight of $Al_2O_3$; from 0% to 15% by weight of CaO; from 0% to 10% by weight of $Li_2O$; from 0% to 20% by weight of ZnO; and from 0% to 15% by weight of $ZrO_2$.

19. The process of claim 2, wherein in step ($a^5$) a temperature sufficient to obtain a glass melt is 1000° C. to 1600° C.

20. The process of claim 1, wherein the redox glass frit is obtained in particulate form or in the form of glass beads.

21. The process of claim 2, wherein the redox glass frit is obtained in particulate form or in the form of glass beads.

22. The process of claim 1, wherein the glass frit is a borosilicate glass frit and step (b) is carried out at a temperature of 1100° C. to 1400° C.

23. The process of claim 1, wherein in step (a) the redox glass frit is introduced sequentially to all or part of the material comprising at least one oxidizable or reducible chemical species.

24. The process of claim 1, further comprising introducing the material comprising at least one oxidizable or reducible chemical species and the redox glass frit into a vitrification furnace at two different points.

25. The process of claim 1, wherein step (b) is carried out in a vitrification furnace.

26. The process of claim 1, wherein the material comprising at least one oxidizable or reducible chemical species is nuclear waste.

27. The process of claim 2, wherein the material comprising at least one oxidizable or reducible chemical species is nuclear waste.

28. The process of claim 1, wherein the material comprising at least one oxidizable or reducible chemical species is waste derived from the incineration of household refuse.

29. The process of claim 2, wherein the material comprising at least one oxidizable or reducible chemical species is waste derived from the incineration of household refuse.

* * * * *